United States Patent
Cho et al.

(10) Patent No.: US 11,038,901 B2
(45) Date of Patent: Jun. 15, 2021

(54) SERVER AND METHOD FOR DEFENDING MALICIOUS CODE USING SAME

(71) Applicant: Samsung Electronics Co., Ltd., Suwon-si (KR)

(72) Inventors: Jungil Cho, Suwon-si (KR); Iljoo Kim, Suwon-si (KR); Hyunwoo Kim, Suwon-si (KR); Daesung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 16/212,083

(22) Filed: Dec. 6, 2018

(65) Prior Publication Data

US 2019/0182271 A1     Jun. 13, 2019

(30) Foreign Application Priority Data

Dec. 7, 2017     (KR) .................. 10-2017-0167220

(51) Int. Cl.
*H04L 29/06* (2006.01)
*H04L 29/08* (2006.01)
(Continued)

(52) U.S. Cl.
CPC .......... *H04L 63/1416* (2013.01); *G06F 21/54* (2013.01); *G06F 21/552* (2013.01);
(Continued)

(58) Field of Classification Search
CPC . H04L 63/1416; H04L 63/1425; H04L 67/12; G06F 21/54; G06F 21/552; G06F 21/554; G06F 21/566

See application file for complete search history.

(56) References Cited

U.S. PATENT DOCUMENTS

| 2013/0198847 A1 | 8/2013 | Sampigethaya |
| 2016/0028754 A1 | 1/2016 | Cruz Mota et al. |

(Continued)

FOREIGN PATENT DOCUMENTS

| EP | 3 079 336 A1 | 10/2016 |
| JP | 2006-504178 A | 2/2006 |

(Continued)

OTHER PUBLICATIONS

European Search Report dated Apr. 3, 2020, issued in European Application No. 18885608.2.

(Continued)

*Primary Examiner* — Oleg Korsak
(74) *Attorney, Agent, or Firm* — Jefferson IP Law, LLP

(57) ABSTRACT

A server is provided. The server includes a communication interface configured to communicate with an electronic apparatus connected to an Internet of things (IoT) device, a storage configured to store a scenario about an attack received by the IoT device from an external apparatus by stages and information relating to a malicious code corresponding to the scenario, and a processor configured to, based on the IoT device being attacked by the external apparatus over at least one step through the electronic apparatus, receive, from the electronic apparatus, an alert for an attack received by stages, and to identify information relating to a malicious code corresponding to at least one alert received from the electronic apparatus based on the pre-stored scenario.

19 Claims, 13 Drawing Sheets

(51) Int. Cl.
  *G06F 21/55*   (2013.01)
  *G06F 21/54*   (2013.01)
  *G06F 21/56*   (2013.01)
(52) U.S. Cl.
  CPC .......... *G06F 21/554* (2013.01); *G06F 21/566* (2013.01); *H04L 63/1425* (2013.01); *H04L 67/12* (2013.01)

(56) References Cited

U.S. PATENT DOCUMENTS

| | | |
|---|---|---|
| 2016/0285904 A1 | 9/2016 | Ye et al. |
| 2017/0180395 A1 | 6/2017 | Stransky-Heilkron |
| 2017/0208077 A1 | 7/2017 | Freedman et al. |
| 2017/0223046 A1 | 8/2017 | Singh |
| 2017/0332232 A1 | 11/2017 | Weinberg et al. |

FOREIGN PATENT DOCUMENTS

| | | |
|---|---|---|
| KR | 10-2006-0026293 A | 3/2006 |
| KR | 10-2016-0043426 A | 4/2016 |
| KR | 10-1692155 B1 | 1/2017 |
| KR | 10-2017-0074386 A | 6/2017 |
| WO | 2004-038594 A1 | 5/2004 |

OTHER PUBLICATIONS

International Search Report dated Mar. 8, 2019, issued in the International Application No. PCT/KR2018/014922.
European Office Action dated Jan. 15, 2021, issued in European Patent Application No. 18 885 608.2.

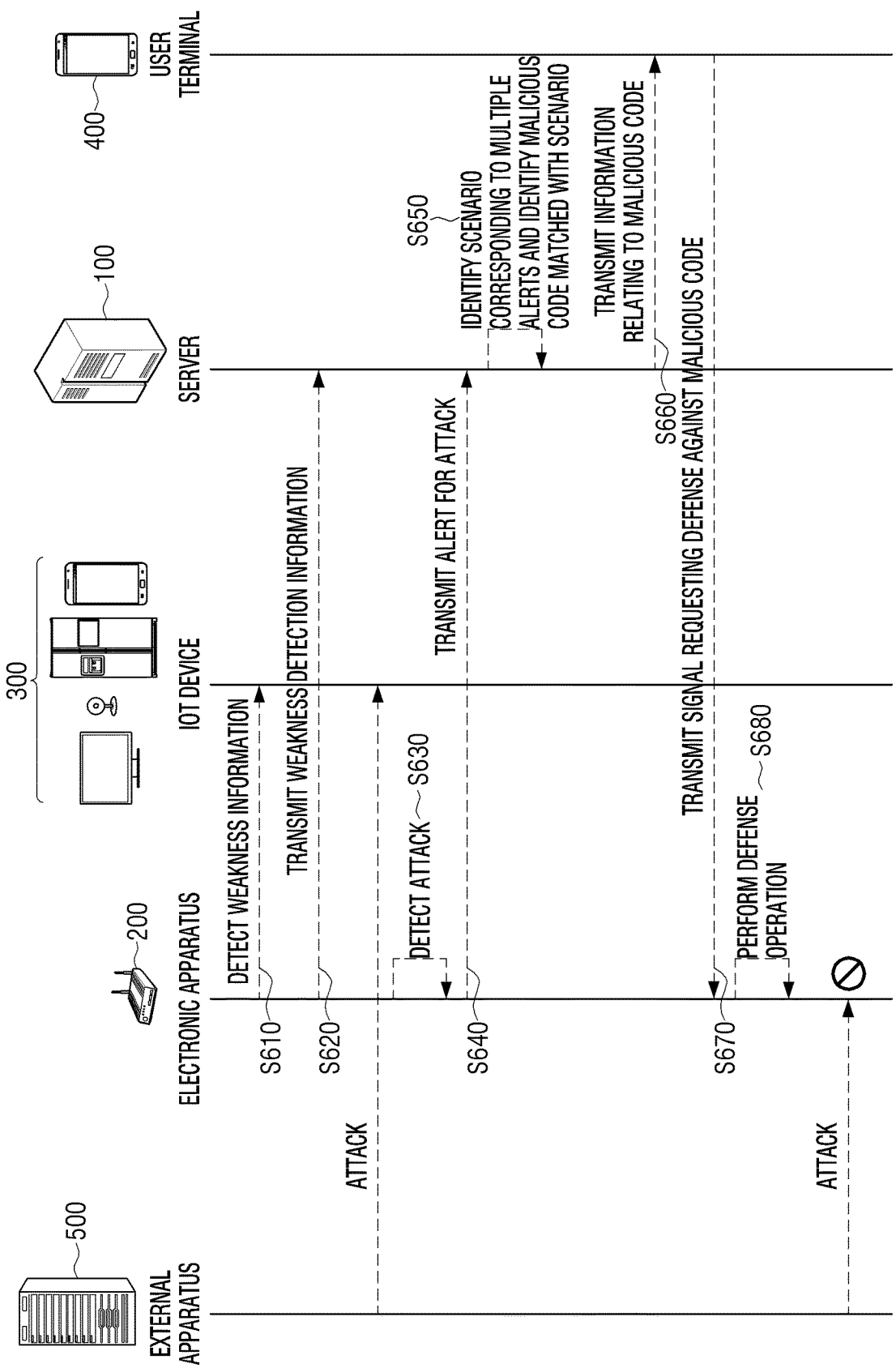

SERVER AND METHOD FOR DEFENDING MALICIOUS CODE USING SAME

CROSS-REFERENCE TO RELATED APPLICATION(S)

This application is based on and claims priority under 35 U.S.C. § 119(a) of a Korean patent application number 10-2017-0167220, filed on Dec. 7, 2017, in the Korean Intellectual Property Office, the disclosure of which is incorporated by reference herein in its entirety.

BACKGROUND

1. Field

The disclosure relates to a server and a method for defending a malicious code using the same. More particularly, the disclosure relates to a server for defending an Internet of things (IoT) device from an attacker, and a method for defending a malicious code using the same.

2. Description of Related Art

The advancement of semiconductor technology and wireless communication technology has developed a variety of electronic devices. More particularly, the Internet of things (IoT) technology enabling data to be exchanged between things in real time has been recently developed. The IoT is an evolved form of the existing ubiquitous sensor network or a machine to machine (M2M), which is characterized by connecting objects on which a communication function is mounted to a network and enabling communication with one another.

Herein the various objects (hereinafter referred to as "IoT device") may be connected to a server for providing an IoT service, thereby establishing an IoT network. Accordingly, the user can easily control the IoT device without time and place restrictions through an electronic apparatus, such as a smartphone connected to the server, etc.

Although the user convenience is enhanced by the IoT technology, recent IoT devices have become a target of attack. The reason is that an IoT device is implemented mainly as a home appliance in the home, and that in general, a normal user living in the home lacks knowledge about security.

Accordingly, even for normal users with little knowledge about security, there is a demand for a technology to defend the IoT device from an attacker.

Therefore, a need exists for a server for defending an Internet of things (IoT) device from an attacker, and a method for defending a malicious code using the same.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned issues and/or disadvantages and to provide at least the advantages described below. Accordingly, an aspect of the disclosure is to provide a server capable of defending an Internet of things (IoT) device from an attacker, and a method for defending against a malicious code using the server.

Additional aspects will be set forth in part in the description which follows and, in part, will be apparent from the description, or may be learned by practice of the presented embodiments.

In accordance with an aspect of the disclosure, a server is provided. The server includes a communication interface configured to communicate with an electronic apparatus connected to an IoT device, a storage configured to store a scenario about an attack received by the IoT device from an external apparatus by stages and information relating to a malicious code corresponding to the scenario, and a processor configured to, based on the IoT device being attacked by the external apparatus over at least one step through the electronic apparatus, receive, from the electronic apparatus, an alert for an attack received by stages, and to identify information relating to a malicious code corresponding to at least one alert received from the electronic apparatus based on the pre-stored scenario.

The processor may be further configured to transmit the identified information relating to the malicious code to at least one of a user terminal and the IoT device.

The scenario may include information relating to an attack sequentially executed by the external apparatus to allow the external apparatus to inject the malicious code into the IoT device.

The processor may be further configured to, based on at least one alert being received from the electronic apparatus, identify an order of attacks received by the IoT device on a basis of information relating to a time at which an attack included in the at least one alert, to identify a scenario having a same order of attack as an order of attack received by the IoT device from among the pre-stored scenario, and to transmit information relating to a malicious code corresponding to the identified scenario to at least one of the user terminal and the IoT device.

The processor may be further configured to, based on the scenario having the same order of attack as the order of attack received by the IoT device not being present from among the pre-stored scenario, to identify a scenario having a consistency of greater than or equal to a predetermined threshold with the attacks received by the IoT device from among the pre-stored scenario, and to transmit information relating to a malicious code corresponding to the identified scenario to at least one of the user terminal and the IoT device.

The processor may be further configured to, based on the scenario having the same order of attack as the order of attacks received by the IoT device not being present from among the pre-stored scenario, match information relating to a malicious code input according to a user command with a scenario corresponding to the order of attacks received by the IoT device and store the information and the scenario matched with each other.

The processor may be further configured to, based on the scenario having the same order of attack as the order of attacks received by the IoT device not being present from among the pre-stored scenario, transmit guide information requesting to block network connection with the external apparatus to at least one of the user terminal and the IoT device.

The processor may be further configured to, based on a security weakness being detected in the electronic apparatus, receive an alert indicating the security weakness from the electronic apparatus, and based on at least one attack from among attacks received by the IoT device over at least one step corresponding to an attack using the security weakness, to transmit the information relating to the malicious code to at least one of the user terminal and the IoT device.

The processor may be further configured to identify whether the IoT device includes a display for displaying the information relating to the malicious code, based on the IoT device including the display, transmit the information relating to the malicious code to the IoT device, and based on the IoT device not including the display, to transmit the information relating to the malicious code to a user terminal.

In accordance with another aspect of the disclosure, a method for defending against a malicious code is provided. The method includes based on an IoT device being attacked by an external apparatus through an electronic apparatus over at least one step, receiving, from the electronic apparatus, an alert for an attack by stages, and identifying information relating to a malicious code corresponding to at least one alert received from the electronic apparatus based on a pre-stored scenario.

The method may further include transmitting the identified information relating to the malicious code to at least one of a user terminal and the IoT device.

The scenario may include information relating to an attack sequentially executed by the external apparatus to allow the external apparatus to inject the malicious code into the IoT device.

The transmitting may include, based on at least one alert being received from the electronic apparatus, identifying an order of attacks received by the IoT device on a basis of information relating to a time at which an attack included in the at least one alert, identifying a scenario having a same order of attack as an order of attack received by the IoT device from among the pre-stored scenario, and transmitting information relating to a malicious code corresponding to the identified scenario to at least one of the user terminal and the IoT device.

The transmitting may include, based on the scenario having the same order of attack as the order of attack received by the IoT device not being present from among the pre-stored scenario, identifying a scenario having a consistency of greater than or equal to a predetermined threshold with the attacks received by the IoT device from among the pre-stored scenario, and transmitting information relating to a malicious code corresponding to the identified scenario to at least one of the user terminal and the IoT device.

The method may further include, based on a scenario having the same order of attack as an order of attacks received by the IoT device not being present from among the pre-stored scenario, match information relating to a malicious code input according to a user command with a scenario corresponding to the order of attacks received by the IoT device, and store the information and the scenario matched with each other.

The transmitting may include, based on the scenario having the same order of attack as the order of attacks received by the IoT device not being present from among the pre-stored scenario, transmitting guide information requesting to block network connection with the external apparatus to at least one of the user terminal and the IoT device.

The transmitting may include, based on a security weakness being detected in the electronic apparatus, receiving an alert indicating the security weakness from the electronic apparatus, and based on at least one attack from among attacks received by the IoT device over at least one step corresponding to an attack using the security weakness, transmitting the information relating to the malicious code to at least one of the user terminal and the IoT device.

The method may further include identifying whether the IoT device includes a display for displaying the information relating to the malicious code, based on the IoT device including the display, transmitting the information relating to the malicious code to the IoT device, and based on the IoT device not including the display, transmitting the information relating to the malicious code to a user terminal.

In accordance with another aspect of the disclosure, an IoT device is provided. The IoT device includes a display, a communication interface configured to communicate with an electronic apparatus, and a processor configured to, based on being attacked by an external apparatus through the electronic apparatus over at least one step, receive, from the electronic apparatus, information relating to a malicious code corresponding to an attack over the at least one step, and to display, on the display, the received information relating to the malicious code. The information relating to the malicious code may be information generated based on the at least one attack and an order of attacks over the at least one step.

The information relating to the malicious code may include at least one of a name of a malicious code corresponding to an attack performed over at least one step, information relating to attacks sequentially executed by the external apparatus (not illustrated) and an order of the attacks, and guide information for defending against the malicious code.

When a user command to defend against the malicious code is input according to the guide information, the processor may perform a defense operation corresponding to the guide information.

In accordance with another aspect of the disclosure, a method for defending against a malicious code is provided. The method includes, based on being attacked by an external apparatus through the electronic apparatus over at least one step, receiving, from the electronic apparatus, information relating to a malicious code corresponding to an attack over the at least one step, and displaying, on the display, the received information relating to the malicious code. The information relating to the malicious code may be information generated based on the at least one attack and an order of attacks over the at least one step.

The information relating to the malicious code may include at least one of a name of a malicious code corresponding to an attack performed over at least one step, information relating to attacks sequentially executed by the external apparatus (not illustrated) and an order of the attacks, and guide information for defending against the malicious code.

The method may further include, when a user command to defend against the malicious code is input according to the guide information, the processor may perform a defense operation corresponding to the guide information.

In accordance with another aspect of the disclosure, a user terminal is provided. The user terminal includes a display, a communication interface configured to communicate with a server connected to an electronic apparatus, and a processor configured to, based on an IoT device connected to the electronic apparatus being attacked by an external apparatus through the electronic apparatus over at least one step, receive, from the server, information relating to a malicious code corresponding to an attack over the at least one step, and to display, on the display, the received information relating to the malicious code. The information relating to the malicious code may be information generated based on the at least one attack and an order of attacks over the at least one step.

The information relating to the malicious code may include at least one of a name of a malicious code corresponding to an attack performed over at least one step, information relating to attacks sequentially executed by the external apparatus (not illustrated) and an order of the attacks, and guide information for defending against the malicious code.

When a user command to defend against the malicious code is input according to the guide information, the processor may perform a defense operation corresponding to the guide information.

In accordance with another aspect of the disclosure, a method for defending against a malicious code is provided. The method includes, based on an IoT device connected to an electronic apparatus being attacked by an external apparatus through the electronic apparatus over at least one step, receiving, from the server, information relating to a malicious code corresponding to an attack over the at least one step, and displaying, on the display, the received information relating to the malicious code. The information relating to the malicious code may be information generated based on the at least one attack and an order of attacks over the at least one step.

The information relating to the malicious code may include at least one of a name of a malicious code corresponding to an attack performed over at least one step, information relating to attacks sequentially executed by the external apparatus (not illustrated) and an order of the attacks, and guide information for defending against the malicious code.

The method may further include, when a user command to defend against the malicious code is input according to the guide information, the processor may perform a defense operation corresponding to the guide information.

According to the various example embodiments, even normal users with little knowledge about security can easily identify a type of attack of an attacker, and easily defend the IoT device from the attacker.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a flowchart illustrating an operation method of a malicious code defense system according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and the claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces In describing example embodiments, detailed description of relevant known functions or components may be omitted if it would obscure the description of the subject matter.

Hereinafter, certain example embodiments will be described below with reference to the accompanying drawings.

Figure 1:
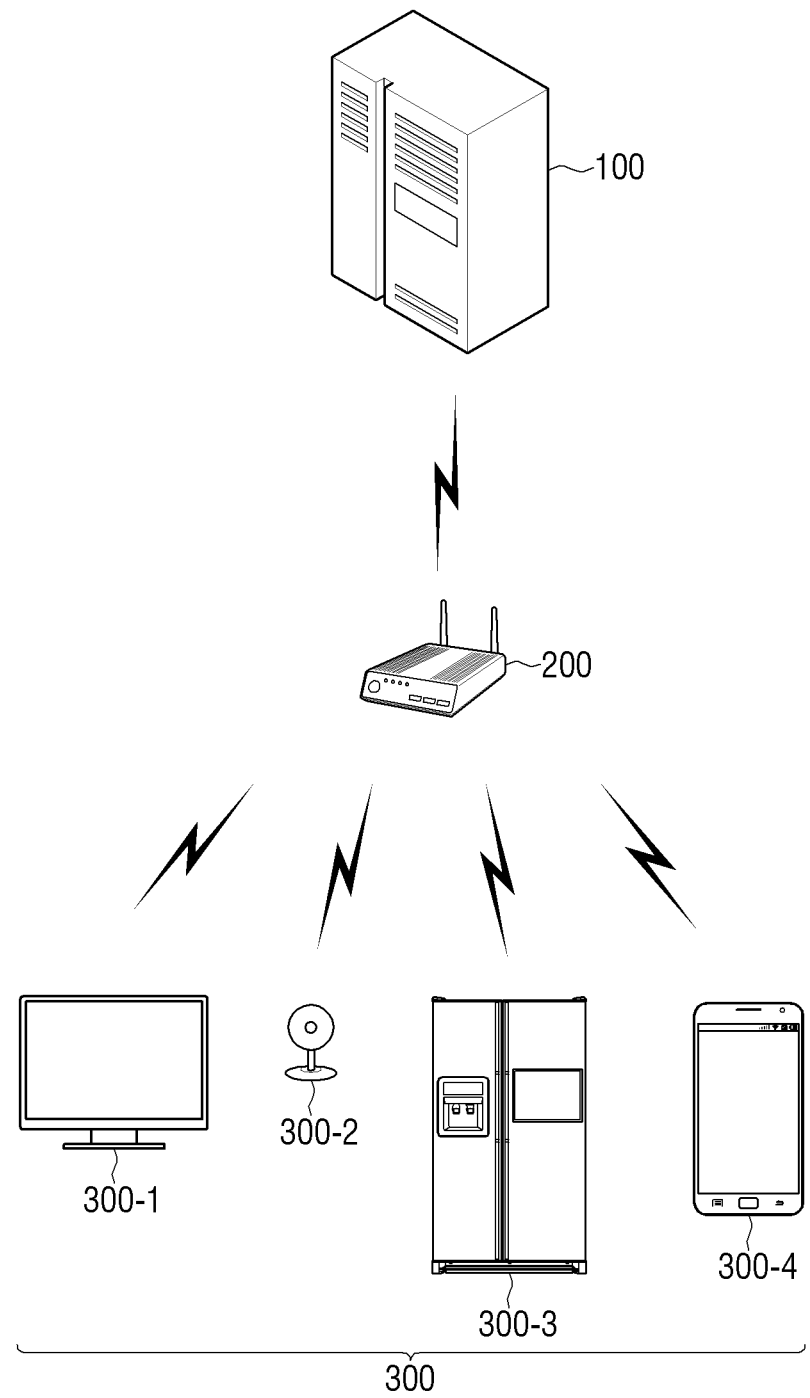
FIG. 1 is a diagram illustrating a malicious code defense system according to an embodiment of the disclosure.

FIG. 1 is a diagram illustrating a malicious code defending system according to an embodiment of the disclosure.

Referring to FIG. 1, a malicious code defense system 1000 according to an example embodiment may include a server 100, an electronic apparatus 200, and at least one Internet of things (IoT) device 300.

For example, the malicious code defense system 1000 may be an IoT system. Herein, the IoT refers to a technology in which the IoT device 300 on which a communication function is mounted is connected to a network so that information is exchanged between a human being and an object or between objects.

As illustrated in FIG. 1, the IoT device 300 may be a computer 300-1, a web cam 300-2, a refrigerator 300-3, and a smartphone 300-4. However, this is only an example, and the IoT device 300 may be a variety of objects, such as an air conditioner, a washing machine, a light bulb, and the like.

Hereinafter, an example embodiment is implemented as an IoT. However, the technical concept of the example embodiment may be applicable to devices capable of accessing the Internet regardless of types thereof. For example, it can be said that the technical concept of the example embodiment is not limited to an IoT.

The electronic apparatus 200 may be connected to the IoT device 300.

For example, the electronic apparatus 200 may be connected to the IoT device 300 using a wireless communication network. However, this is only an example, and the electronic apparatus 200 may be connected to the IoT device 300 using various networks, such as a Bluetooth network, a Wi-Fi network, a ZigBee network, a near field communication (NFC) network, and the like.

The electronic apparatus 200 performing this function may be implemented as a router and the like.

Meanwhile, the electronic apparatus 200 may detect an attack of an external apparatus (not illustrated) to the IoT device 300.

Herein, the attack of the external apparatus (not illustrated) may be a case where the external apparatus (not illustrated) attacks the IoT device 300 via a network of the electronic apparatus 200.

For example, the electronic apparatus 200 may detect, as an attack of an external apparatus (not illustrated), a case where the unauthenticated external apparatus (not illustrated) scans a weakness of the IoT device 300 via the network of the electronic apparatus 200, a case where the unauthenticated external apparatus (not illustrated) generates a buffer overflow (BOF) via the network of the electronic apparatus 200, or the like.

To this end, the electronic apparatus 200 may include a sensing module to detect an attack of the external apparatus (not illustrated). For example, the sensing module may be a network scan module, a network weakness scan module, etc.

In addition, when an attack of the external apparatus (not illustrated) is detected, the electronic apparatus 200 may generate an alert about the attack.

For example, when the attack of the external apparatus (not illustrated) is detected, the electronic apparatus 200 may identify a type, time, etc. of the attack, and generate an alert including the information.

For example, when an unauthenticated external apparatus (not illustrated) scans a weakness of the IoT device 300 via a network of the electronic apparatus 200 at 00(hr):00(min):00(sec), the electronic apparatus 100 may generate a first alert of "{network scan attack sensed, xx:xx:xx}", and when the unauthenticated external apparatus (not illustrated) generates a BOF via the network of the electronic apparatus 200 at 00(hr):00(min):30(sec), generate a second alert of "{buffer over flow attack sensed, 00:00:30}".

Thereafter, the electronic apparatus 200 may transmit an alert about the attack to the server 100.

To this end, the electronic apparatus 200 may be connected to the server 100.

For example, the electronic apparatus 200 may be connected to the server 100 using a wireless communication network. However, this is only an example, and the electronic apparatus 200 may be connected to the server 100 via various communication links, such as a local area network (LAN), a wide area network (WAN), and the like.

The server 100 may receive an alert about the attack from the electronic apparatus 200.

Meanwhile, when an alert about the attack is received from the electronic apparatus 200, a related-art server fragmentarily provides information corresponding to the received alert to the user. For example, in a case of the example embodiment described above, the related-art server provides the information "network scan attack sensed" to the user when the first alert is received, and provides the information BOF attack sensed when the second alert is received.

However, in recent years, the attack of an external apparatus (not illustrated) is generally carried out step by step, not just as a one-time attack. For example, in a case of "Distributed Denial of Service (DDoS)", in general, first, a weakness of the IoT device 300 is determined through "network scan attack", thereafter, BOF attack is performed using the weakness, and through this, the "host right" of the IoT device 300 is "acquired" and then, a DDoS malware is injected into the IoT device 300.

Accordingly, as in the related-art server, when information about an attack performed by an external apparatus (not illustrated) is fragmentarily provided, there is an issues that it is impossible to defend against an attack performed step by step, such as DDoS. The reason is that it is difficult to identify an attack to be ultimately performed by the external apparatus (not illustrated) solely by receiving fragmentary information. More particularly, this is even more difficult for normal users with little knowledge about security.

To address this issue, the server 100 according to an example embodiment may identify an attack to be performed by an attacker based on an alert for the attack received step by step in a comprehensive manner, and provide a defense guide thereto. This example will be described with reference to FIG. 2.

Figure 2:
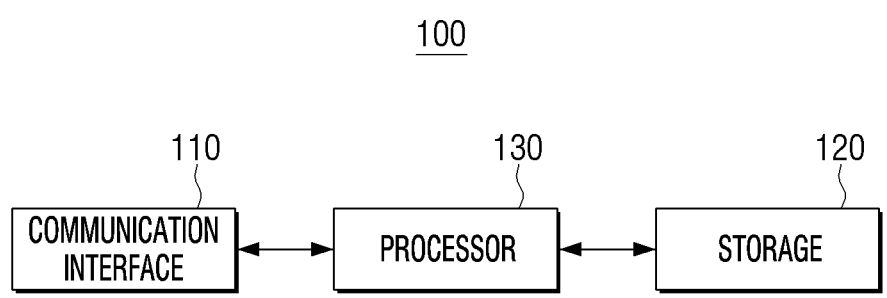
FIG. 2 is a block diagram illustrating a server according to an embodiment of the disclosure.

FIG. 2 is a block diagram illustrating a server according to an embodiment of the disclosure.

Referring to FIG. 2, the server 100 according to an example embodiment may include a communication interface 110, a storage 120, and a processor 130.

The communication interface 110 may communicate with the electronic apparatus 200 according to various types of communication methods and perform transmission and reception.

For example, the communication interface 110 may communicate with the electronic apparatus 200 and receive an attack alert from the electronic apparatus 200. For example, in a case that an external apparatus (not illustrated) performs an attack to the IoT device 300 through the electronic apparatus 200, the communication interface 110 may receive an alert for the attack from the electronic apparatus 200.

For example, when an unauthenticated external apparatus (not illustrated) scans a weakness of the IoT device 300 via a network of the electronic apparatus 200 at 00(hr):00(min):00(sec), the communication interface 110 may receive an alert of "{network scan attack sensed, xx:xx:xx}" from the electronic apparatus 200. When the unauthenticated external apparatus (not illustrated) generates a BOF via the network of the electronic apparatus 200 at 00(hr):00(min):30(sec), the communication interface 110 may receive an alert of "{buffer overflow, 00:00:30}" from the electronic apparatus 200.

Meanwhile, in a case that the external apparatus (not illustrated) attacks the IoT device 300 through the electronic apparatus 200 over one or more steps, the communication interface 110 may sequentially receive an alert for the attack from the electronic apparatus 200. For example, the communication interface 110 may continuously receive an attack alert through communication with the electronic apparatus 200.

In addition, the communication interface 110 may transmit information relating to a malicious code to the electronic apparatus 200. Herein, the information relating to the malicious code may include a name of malicious code to be executed in the IoT device 300 by the external apparatus (not illustrated) or injected into the IoT device 300, and guide information for defending the malicious code. Meanwhile, the malicious code may be referred to as a malicious software (malware), a malicious program, or the like.

To this end, the communication interface 110 may be connected to the electronic apparatus 200 using a wireless communication network. However, this is only an example, and the communication interface 100 may be connected to the electronic apparatus 200 via various communication links, such as a LAN, a WAN, and the like.

In addition, the communication interface 110 may communicate with the IoT device 300 according to various types of communication methods and perform transmission and reception.

For example, the communication interface 110 may communicate with the IoT device 300 and transmit information about the malicious code to the IoT device 300. As described above, the information relating to the malicious code may include a name of malicious code to be executed in the IoT device 300 by the external apparatus (not illustrated) or injected into the IoT device 300, and guide information for defending the malicious code.

To this end, the communication interface 110 may be connected to the IoT device 300 using a wireless communication network. However, this is only an example, and the communication interface 110 may be connected to the IoT device 300 via a network of the electronic apparatus 100.

In addition, as described above, the communication interface 110 may be connected to a user terminal (not illustrated) via a wireless communication network. In this case, the communication interface 110 may transmit information relating to a malicious code to the user terminal (not illustrated).

The storage 120 may store an operating system (OS) for controlling overall operations of the elements of the server 100, and a command or data related to the elements of the server 100.

Accordingly, the processor 130 may control a plurality of hardware or software elements of the server 100 by using diverse commands or data in the storage 120, load and process a command or data received from at least one of the other components in a volatile the memory, and store diverse data in a non-volatile memory.

More particularly, the storage 120 may store a scenario of an attack that the IoT device 300 receives from the external apparatus (not illustrated) by stages, and information relating to a malicious code corresponding to the scenario.

For example, in a case that the external apparatus (not illustrated), to inject a malicious code A into the IoT device 300, performs a first attack to the IoT device 300 at a first step, performs a second attack to the IoT device 300 at a second step, and performs a third attack to the IoT device 300 at a third step, the storage 120 may match a scenario including the first to third steps with the information relating to the malicious code A and store it.

Herein, the information relating to the malicious code may not only include information relating to a name of the malicious code A but also further include guide information for defending against execution of the malicious code A in the IoT device 300 or injection of the malicious code A into the IoT device 300.

The processor 130 may control the overall operations of the server 100.

To this end, the processor 130 may include a central processing unit (CPU), a random access memory (RAM), and a read only memory (ROM), and may execute an arithmetic operation or data processing associated with controlling the other elements included in the server 100. For example, the processor 130 may be realized as a system on chip (SoC).

The processor 130 may receive, from the electronic apparatus 200, an alert of at least one attack.

For example, in a case that the IoT device 300 is under attack from an external apparatus (not illustrated) through the electronic apparatus 200, the processor 130 may receive, from the electronic apparatus 200 an alert for the attack. More particularly, in a case that the IoT device 300 is under attack over at least one step, the processor 130 may receive, from the electronic apparatus 200, an alert for the attack received by stages.

For example, when an unauthenticated external apparatus (not illustrated) scans a weakness of the IoT device 300 via a network of the electronic apparatus 200 at 00(hr):00(min):00(sec), the processor 130 may receive an alert of "{network scan attack sensed, xx:xx:xx}" from the electronic apparatus 200. When the unauthenticated external apparatus (not illustrated) generates a BOF via the network of the electronic apparatus 200 at 00(hr):00(min):30(sec), the processor 130 may receive an alert of "{buffer overflow, 00:00:30}" from the electronic apparatus 200 by stages.

In addition, the processor 130 may identify information about a malicious code corresponding to at least one alert received from the electronic apparatus 200 based on a pre-stored scenario.

To this end, the processor 130 may identify a scenario corresponding to the at least one alert received from the electronic apparatus 200 from among at least one scenario stored in the storage 120.

For example, when at least one alert is received from the electronic apparatus 200, the processor 130 may identify an order of attack received by the IoT device 300 based on information about a time when an attack included in the at least one alert is performed, and identify a scenario having the same order of attack as the order of attack received by the IoT device 300 from among the pre-stored scenario.

For example, in a case that an external apparatus (not illustrated) performs a first attack with respect to the IoT device 300 at a first time, the processor 130 may receive an alert of the first attack from the electronic apparatus 200. In a case that the external apparatus (not illustrated) performs a second attack with respect to the IoT device 300 at a second time, the processor 130 may receive an alert of the second attack from the electronic apparatus 200. In addition, in a case that the external apparatus (not illustrated) performs a third attack with respect to the IoT device 300 at a third time, the processor 130 may receive an alert of the third attack from the electronic apparatus 200.

In this case, the processor 130 may identify a chronological order in which the external apparatus (not illustrated) attacked the IoT device 300 based on time information included in the first to third alerts.

In addition, when it is determined that the first to third attacks have been performed the IoT device 300 in an order from the first to third alerts, the processor 130 may identify a scenario in which the first to third attacks are performed in the order of the first to third alerts from among the at least one scenario stored in the storage 120.

Thereafter, the processor 130 may identify information about a malicious code corresponding to the identified scenario.

To this end, the processor 130 may use information relating to a malicious code stored in the storage 120. For example, the processor 130 may identify information about a malicious code matched with the identified scenario based on the scenario matched for each malicious code and stored.

For example, in the example embodiment described above, in a case that the information about the malicious code A is matched with the scenario including the first to third alerts and stored in the storage 120, when the first to third alerts are received from the electronic apparatus 200 by stages, the processor 130 may identify the information about the malicious code A matched with the scenario including the first to third alerts.

Herein, the information relating to the malicious code may include a name of malicious code to be executed in the IoT device 300 by the external apparatus (not illustrated) or injected into the IoT device 300, and guide information for defending the malicious code.

In addition, the processor 130 may transmit information relating to a malicious code to the IoT device 300.

For example, the processor 130 may directly transmit the information relating to the malicious code to the IoT device 300. To this end, the processor 130 may use various networks including a wireless communication network, a Bluetooth network, a Wi-Fi network, etc.

In addition, the processor 130 may transmit information relating to a malicious code to the IoT device 300 through the electronic apparatus 200. In this case, the processor 130 may transmit, to the electronic apparatus 200, a signal including a command requesting transmission of the information relating to the malicious code to the IoT device 300 along with the information relating to the malicious code. Accordingly, the information relating to the malicious code may be transmitted from the electronic apparatus 200 to the IoT device 300.

In addition, the processor 130 may transmit information relating to a malicious code to the user terminal (not illustrated).

As described above, the server 100 according to an example embodiment can provide information relating to an attack to be performed by an attacker by comprehensively considering an alert for an attack received by stages, unlike a related-art server fragmentarily providing the alert for the attack.

Accordingly, there is an advantageous effect that even normal users with little knowledge can identify an attack to be ultimately performed by the external apparatus (not illustrated), and that the IoT device 300 can be defended from an attack of an attacker according to a defense guide.

Figure 3A:
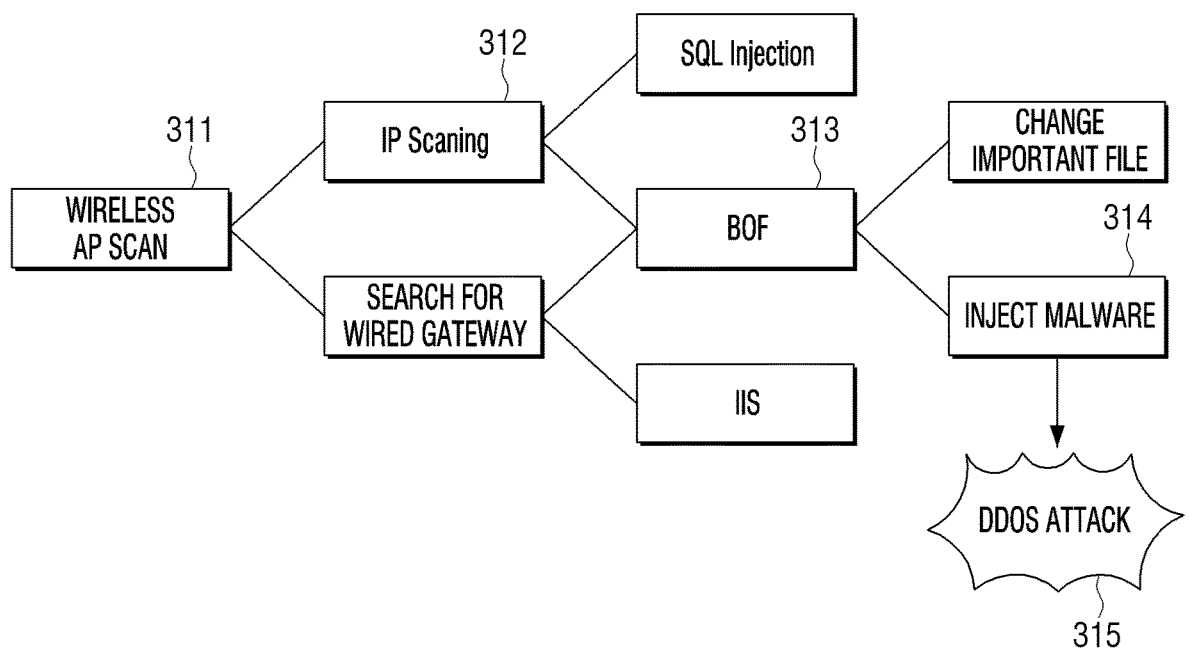
FIGS. 3A and 3B are diagrams illustrating a scenario and information about a malicious code corresponding to a scenario according to various embodiments of the disclosure.
Figure 3B:
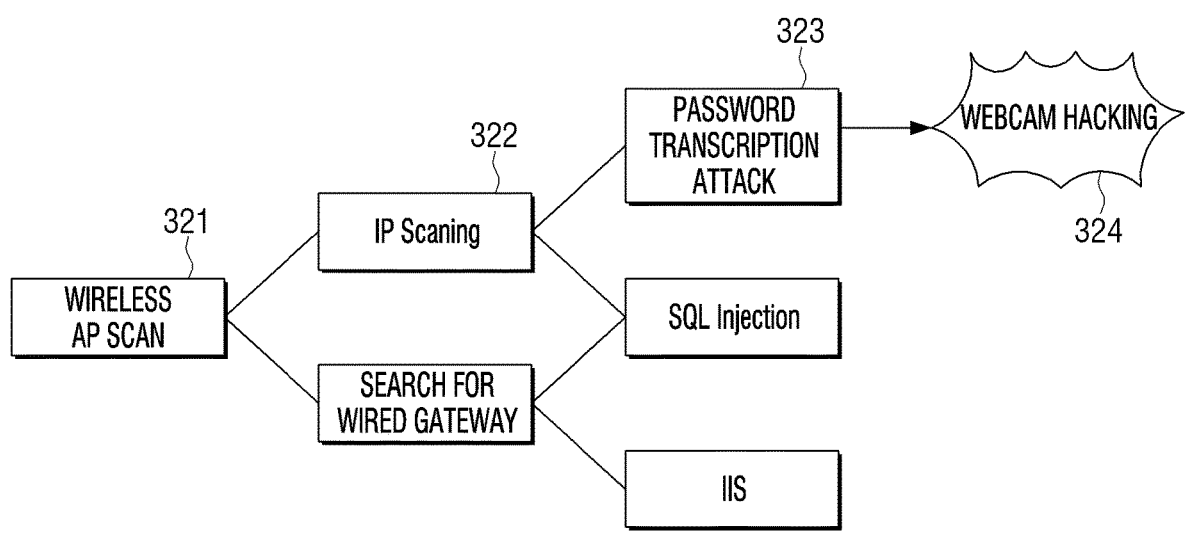

FIGS. 3A and 3B are diagrams illustrating a scenario and information about a malicious code corresponding to a scenario according to various embodiments of the disclosure.

Referring to FIGS. 3A and 3B, the storage 120 according to an example embodiment may store a scenario of a tree structure. However, this is only for the convenience of explanation, and the storage 120 may match a scenario with information relating to a malicious code in various forms, and store it.

FIG. 3A is a diagram illustrating a DDoS according to an embodiment of the disclosure.

Referring to FIG. 3A, the scenario according to an example embodiment may include information relating to attacks that are sequentially executed for the external apparatus (not illustrated) to inject a malicious into an IoT device 300. Herein, the malicious code may be a DDoS malicious software (malware).

In general, to inject the DDoS malicious malware into the IoT device 300, the external apparatus (not illustrated) may scan a wireless access point (AP) surrounding the IoT device 300, scan an Internet protocol (IP) of the scanned AP, performs an buffer overflow attack to a network of the scanned IP, that is, a network to which the IoT device 300 is connected, and then inject the DDoS malware into the IoT device 300.

In this case, the processor 130 may receive, from the external apparatus 200, an alert according to the attack of the external apparatus (not illustrated) by stages. For example, in a case that the external apparatus (not illustrated) scans a wireless AP of the electronic apparatus 200, the processor 130 may receive a first alert of "{wireless AP scan attack sensed}" from the electronic apparatus 200. In a case that the external apparatus (not illustrated) scans the IP of the electronic apparatus 200, the processor 130 may receive a second alert of "{IP scan attack sensed}" from the electronic apparatus 200. In a case that the external apparatus (not illustrated) generates a BOF via the network of the electronic apparatus 200, the processor 130 may receive, from the electronic apparatus 200, a third alert of "{BOF attack sensed}". In addition, in a case that the external apparatus (not illustrated) injects a malware into the IoT device 300 via the network of the electronic apparatus 200, a fourth alert of "{malware injection sensed}" may be received from the electronic apparatus 200.

In this case, the processor 130 may identify an order in which attacks respectively corresponding to the first to fourth alerts are performed, based on time information included in the first to fourth alerts.

In addition, when it is identified that the attack of the external apparatus (not illustrated) is performed in an order of a wireless AP scan attack, an IP scan attack, a BOF attack, and a malware injection attack, the processor 130 may identify a scenario consisting of an order of a wireless AP scan attack 311, an IP scan attack 312, a BOF attack 313, and a malware injection 314 from among the at least one scenario stored in the storage 120.

Thereafter, the processor 130 may identify information about a malicious code matched with the identified scenario.

Referring to FIG. 3A, information 315 relating to a DDoS attack may be matched with a scenario corresponding to the first to fourth alerts described above.

Herein, the information relating to the DDoS attack may include information indicating that an attack currently performed to the external apparatus (not illustrated) is a DDoS attack, and guide information for defending the DDoS attack. For example, the guide information for defending the DDoS attack may be information guiding to blocking an IP of the attacker, information guiding installation of a firewall of the electronic apparatus 200.

FIG. 3B is a diagram illustrating a web cam attack scenario according to an embodiment of the disclosure.

Referring to FIG. 3B, the IoT device 300 according to an example embodiment may be implemented as a web cam. However, the web cam is installed based on an IP, which is easily accessible from the outside and has a number of security weaknesses, and thus has recently become a target of attack of attackers.

More particularly, users who are indifferent to security directly uses a web cam by using a default password for the web cam or using a simple password. Accordingly, the web cam has become a target of password transcription attack.

In general, to attack a web cam, the external apparatus (not illustrated) may acquire a password of the web cam by scanning a wireless AP surrounding the web cam, scanning an IP of the scanned AP, and performing the password transcription attack to the scanned IP.

In this case, the processor 130 may receive, from the external apparatus 200, an alert according to the attack of the external apparatus (not illustrated) by stages. For example, in a case that the external apparatus (not illustrated) scans a wireless AP of the electronic apparatus 200, the processor 130 may receive a first alert of "{wireless AP scan attack sensed}" from the electronic apparatus 200. In a case that the external apparatus (not illustrated) scans the IP of the electronic apparatus 200, the processor 130 may receive a second alert of "{IP scan attack sensed}" from the electronic apparatus 200. In a case that the external apparatus (not illustrated) receives the password transcription attack via the network of the electronic apparatus 200, the processor 130 may receive a third alert of "{password transcription attack sensed}" from the electronic apparatus 200.

In this case, the processor 130 may identify an order in which attacks respectively corresponding to the first to third alerts are performed, based on time information included in the first to third alerts.

In addition, when it is identified that the attack of the external apparatus (not illustrated) is performed in an order of a wireless AP scan attack, an IP scan attack, and a password transcription attack, the processor 130 may identify a scenario consisting of an order of a wireless AP scan attack 321, an IP scan attack 322, and a password transcription attack 323 from among the at least one scenario stored in the storage 120.

Thereafter, the processor 130 may identify information about a malicious code matched with the identified scenario.

Referring to FIG. 3B, information relating to a web cam attack 324 may be matched with a scenario corresponding to the first to third alerts described above.

Herein, the information relating to the web cam attack may include information indicating that an attack currently performed to the external apparatus (not illustrated) is a web cam attack, and guide information for defending the web cam attack. For example, the guide information for defending the web cam attack may be information guiding to blocking an IP of the attacker, information guiding installation of a firewall of the electronic apparatus 200.

Meanwhile, the processor 130 may transmit the identified malicious code information to at least one of the IoT device 300 and the user terminal. This will be described below with reference to FIGS. 4A, 4B, 5A, and 5B hereinafter.

FIGS. 4A, 4B, 5A and 5B are diagrams illustrating an object to which information about a malicious code is transmitted and a user interface (UI) corresponding to the malicious code information according to various embodiments of the disclosure.

The processor 130 may, as described above, identify information relating to a malicious code corresponding to a plurality of alerts received from the electronic apparatus 200 based on a pre-stored scenario.

In addition, the processor 130 may identify an object of transmission of the identified malicious code information.

For example, the processor 130 may identify an object of transmission of the malicious code information on the basis of whether the IoT device 300 includes a display for displaying the malicious code information.

To this end, the processor 130 may identify whether the IoT device 300 includes the display for displaying the malicious code information.

For example, the processor 130 may identify whether the IoT device 300 includes the display on the basis of pre-stored device information of the IoT device 300. Herein, the device information may include identification information of the IoT device 300, and information about whether the display is provided in the IoT device 300 may be mapped with the identification information.

In addition, when it is identified that the IoT device 300 includes the display for displaying the malicious code information, the processor 130 may transmit the malicious code information to the IoT device 300.

Figure 4A:
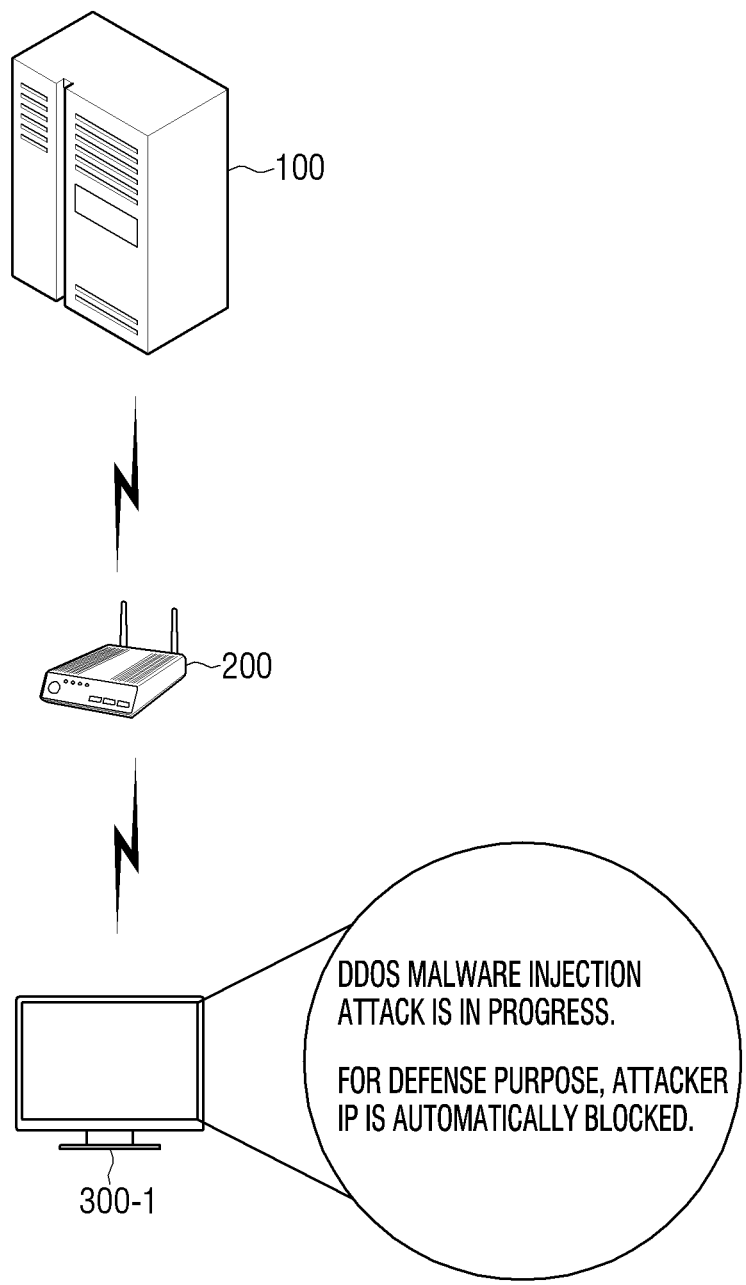
FIGS. 4A, 4B, 5A and 5B are diagrams illustrating an object to which information about a malicious code is transmitted and a user interface (UI) corresponding to the malicious code information according to various embodiments of the disclosure.
Figure 4B:
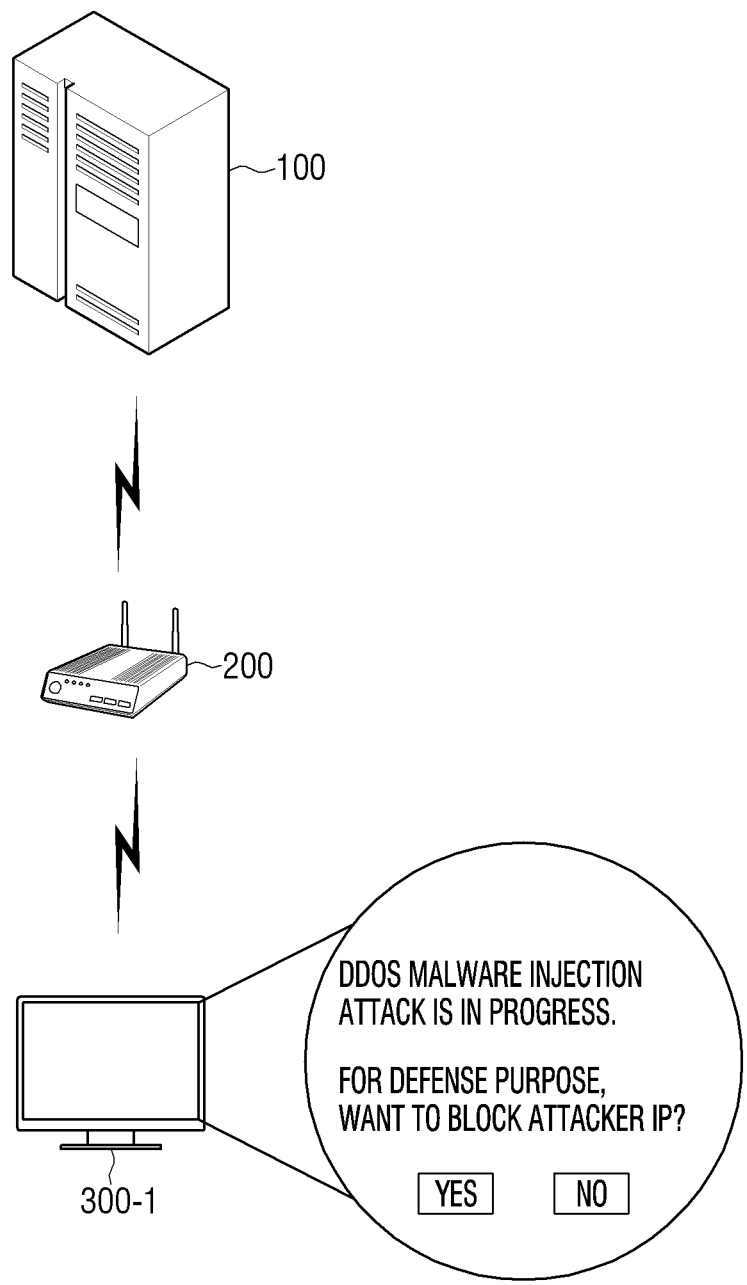

Referring to FIGS. 4A and 4B, in a case that the IoT device 300 is implemented as a computer 300-1 including a monitor, the processor 130 may transmit the identified malicious code information to the IoT device 300.

In addition, when the malicious code information is received, the IoT device 300-1 may display a UI corresponding to the received malicious code information on the display. Herein, the malicious code information may include a name of the malicious code, and guide information for defending the malicious code.

Meanwhile, the UI corresponding to the malicious code may differ depending on the defense mode of the IoT device 300-1.

For example, in a case that the IoT device 300-1 is set to an automatic defense mode, the IoT device 300-1 may display a UI indicating that a defense is performed automatically according to the guide information received from the server 100.

Referring to FIG. 4A, in a case that the external apparatus (not illustrated) is performing a DDoS attack, the IoT device 300-1 may display, on the display, a UI, such as "DDoS malware injection attack is in progress" and "IP of attacker is automatically blocked for defense purposes" on the basis of the received malicious code information.

Thereafter, the IoT device 300-1 may automatically perform a defense operation according to the guide information received from the server 100.

Meanwhile, in a case that the IoT device 300-1 is not set to the automatic defense mode, the IoT device 300-1 may display a UI requesting a user selection as to whether to perform a defense according to the guide information.

Referring to FIG. 4B, in a case that the external apparatus (not illustrated) is performing a DDoS attack, the IoT device 300-1 may display, on the display, a UI, such as "DDoS malware injection attack is in progress", "Want to block IP of attacker for defense purposes", "YES?" and "NO" on the basis of the received malicious code information.

Thereafter, when "YES" is selected according to a user command, the IoT device 300-1 may perform an operation for the purpose of defense according to the guide information.

Meanwhile, in FIGS. 4A and 4B, the IoT device 300-1 receives the malicious code information through the electronic apparatus 200. However, as described above, the processor 130 may directly transmit the malicious code information to the IoT device 300-1.

In addition, herein, in a case that the processor 130 transmits the malicious code information to the IoT device 300. However, the processor 130 may transmit the malicious code information to a user terminal, or may transmit the malicious code information to both the IoT device 300 and the user terminal.

In addition, when it is identified that the IoT device 300 does not include the display for displaying the malicious code information, the processor 130 may transmit the malicious code information to the user terminal.

Figure 5A:
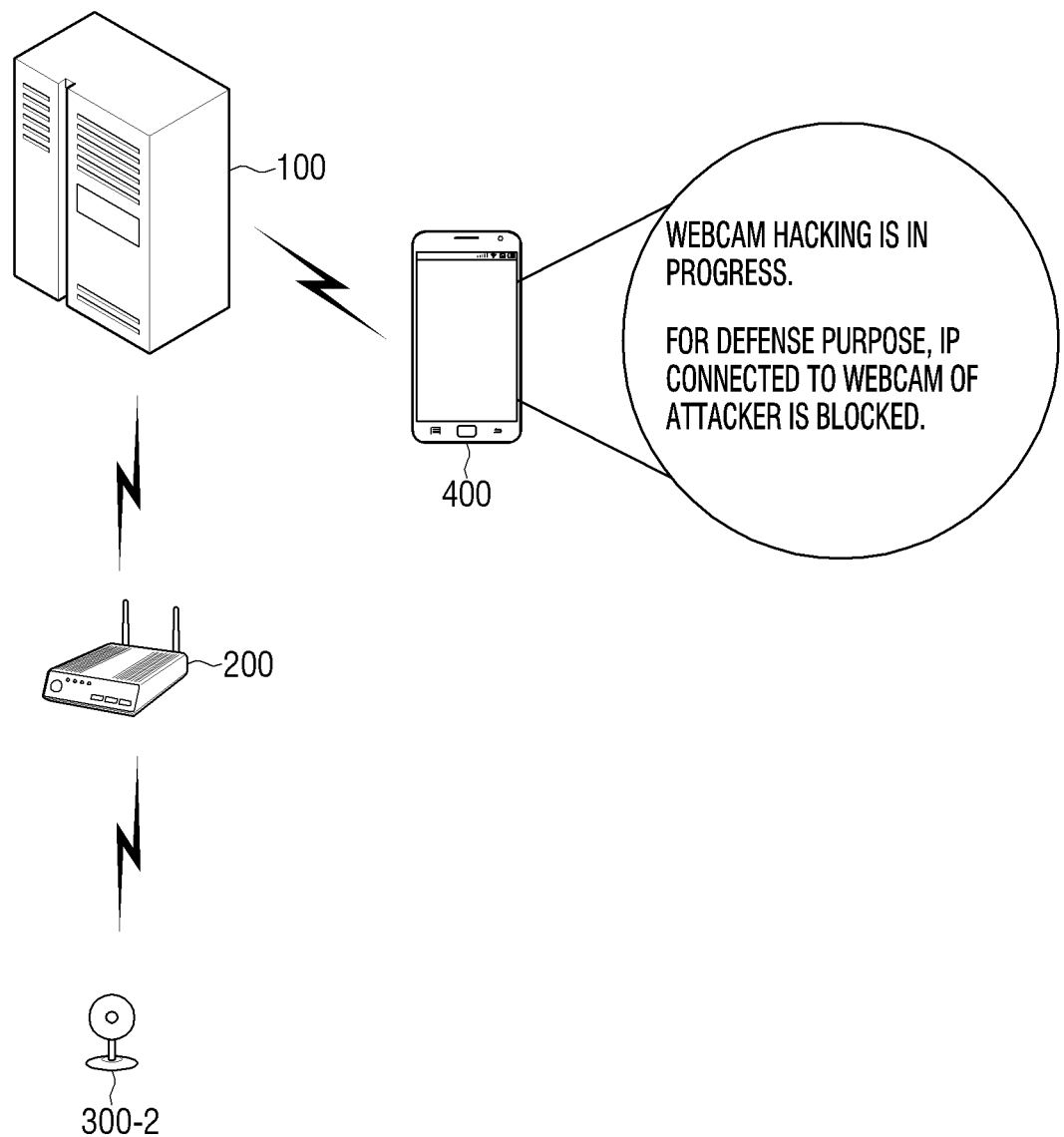
Figure 5B:
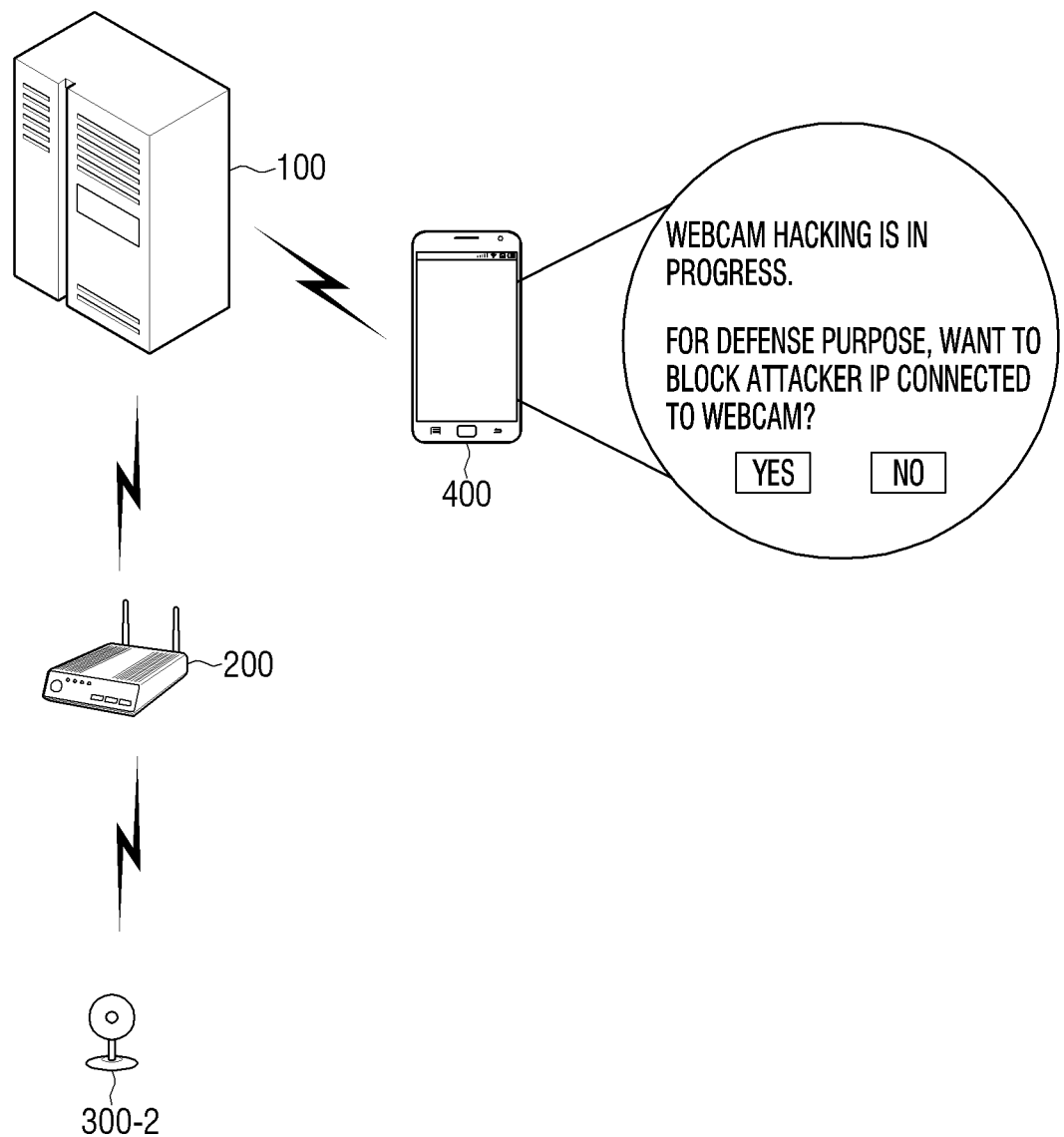

Referring to FIGS. 5A and 5B, in a case that the IoT device 300 is implemented as a web cam 300-2 without a display, the processor 130 may transmit the identified malicious code information to the user terminal 400.

In addition, when the malicious code information is received, the user terminal 400 may display a UI corresponding to the received malicious code information on the display. Herein, the malicious code information may include a name of the malicious code, and guide information for defending the malicious code.

Meanwhile, as described above, the UI corresponding to the malicious code may differ depending on the defense mode of the IoT device 300-2.

For example, in a case that the IoT device 300-1 is set to an automatic defense mode, the user terminal 400 may display a UI indicating that a defense of the IoT device 300-1 is performed automatically according to the guide information received from the server 100.

Referring to FIG. 5A, in a case that the external apparatus (not illustrated) is performing a password transcription attack for the purpose of webcam hacking, the user terminal 400 may display, on the display, a UI, such as "Webcam hacking is in progress" and "IP of attacker connected to webcam is automatically blocked for defense purposes" on the basis of the received malicious code information.

Thereafter, the user terminal 400 may automatically perform a defense operation according to the guide information received from the server 100.

In contrast, in a case that the IoT device 300-1 is not set to the automatic defense mode, the user terminal 400 may display a UI requesting a user selection as to whether to perform a defense according to the guide information.

Referring to FIG. 5B, in a case that the external apparatus (not illustrated) is performing a password transcription attack for the purpose of webcam hacking, the user terminal 400 may display, on the display, a UI, such as "Webcam hacking is in progress" and "Want to block IP of attacker connected to webcam for defense purposes?", "YES" and "NO" on the basis of the received malicious code information.

Thereafter, when "YES" is selected according to a user command, the user terminal 400 may perform an operation for the purpose of defense according to the guide information.

Accordingly, even in a case that the IoT device 300 does not include a display, the user may recognize the presence of attack of the external apparatus (not illustrated) through the user terminal 400, and easily defend against the attack of the external apparatus (not illustrated).

Meanwhile, herein, in a case that the IoT device 300 does not include a display, the information about the malicious code is transmitted to the user terminal 400. However, the processor 130 may transmit the malicious code information to the IoT device 300.

In this case, the processor 130 may transmit, to the IoT device 300, information relating to the malicious code including a command to output the ongoing attack of the attacker through a speaker of the IoT device 300, or may transmit, to the IoT device 300, information relating to the malicious code including a command to display the ongoing attack of the attacker through blinking LED of the IoT device 300, etc. In addition, the processor 130 may transmit, to the IoT device 300, information relating to the malicious code including a command to automatically block an IP of the attacker.

FIG. 6 is a flowchart illustrating an operation method of a malicious code defense system according to an embodiment of the disclosure.

Referring to FIG. 6, first, the electronic apparatus 200 may detect a security weakness of the IoT device 300, at operation S610. To this end, the electronic apparatus 200 may include a weakness scan module.

For example, the electronic apparatus 200 may, through the weakness scan module, detect whether an external apparatus 500 is capable of accessing data of the IoT device 300, and detect whether the external apparatus 500 is capable of injecting a malicious code into the IoT device 300.

In addition, the electronic apparatus 200 may transmit the detected security weakness to the server 100, at operation S620. In this case, the server 100 may store the security weakness of the IoT device 300 received from the electronic apparatus 200.

Thereafter, in a case that the IoT device 300 is under attack from the electronic apparatus 500, the electronic apparatus 200 may detect the attack of the external apparatus 500 at operation S630.

For example, the electronic apparatus 200 may detect, as an attack of the external apparatus 500, a case where the external apparatus 500 scans a weakness of the IoT device 300 via the network of the electronic apparatus 200, a case where the external apparatus 500 generates a BOF via the network of the electronic apparatus 200, or the like.

In addition, the electronic apparatus 200 may transmit an attack alert to the server 100, at operation S640.

For example, in a case that the IoT device 300 is attacked by the external apparatus 500 over at least one stage, the electronic apparatus 200 may transmit an alert for the attack received for each step to the server 100.

For example, in FIG. 6, only one attack is described for convenience of explanation. However, in a case that the external apparatus 500 attacks the IoT device 300 over a plurality of steps, the electronic apparatus 200 may transmit a plurality of alerts for the attack received for each step to the server 100.

The server 100 may identify a scenario corresponding to at least one alert received from the electronic apparatus 200 from among pre-stored scenarios, at operation S650.

For example, when at least one alert is received from the electronic apparatus 200, the server 100 may identify an order of attack received by the IoT device 300 based on information about a time when an attack included in the at least one alert is performed, and identify a scenario having the same order of attack as the IoT device 300 from among the pre-stored scenarios.

In addition, the server 100 may identify information relating to a malicious code matched with the identified scenario, and transmit the malicious code information to the IoT device or a user terminal 400, at operation S660. Herein, the information relating to the malicious code may include a name of malicious code to be executed in the IoT device 300 by the external apparatus 500 or injected into the IoT device 300, and guide information for defending the malicious code.

In a case that at least one of attacks received by the IoT device 300 over at least one step corresponds to an attack using a security weakness, the server 100 according to an example embodiment may transmit the malicious code information to the IoT device or the user terminal 400 at operation S670.

This is to prevent false detection, such as determination of an attack even when an external apparatus (not illustrated) attacks the IoT device 300. For example, it is reflected that an attack is generally performed through a security weakness of the IoT device 300.

To this end, the server 100 may identify whether an attack using a security weakness of the IoT device 300 is present from among the attacks of the electronic apparatus 500. For example, the server 100 may, using a security weakness of the IoT device 300 received from the electronic apparatus 200, identify whether an attack using the security weakness of the IoT device 300 is present from among the attacks of the electronic apparatus 500.

Thereafter, when a user command to defend against a malicious code is input through the IoT device or the user terminal 400, the IoT device or the user terminal 400 may transmit a signal requesting defense against the malicious code to the electronic apparatus 200. Herein, the signal requesting defense against the malicious code may include a command requesting to block an IP of the external apparatus 500, a command requesting to block a particular port, and the like.

In addition, the electronic apparatus may perform a defense operation on the basis of the received signal at operation S680, and accordingly defend the IoT device 300 from the electronic apparatus 500 attacking via the electronic apparatus 200.

As described above, the malicious code defense system according to an example embodiment can provide information relating to an attack to be performed by an attacker by comprehensively considering an alert for an attack received by stages, unlike a related-art server fragmentarily providing the alert for the attack.

Accordingly, there is an advantageous effect that even normal users with little knowledge can identify an attack to be ultimately performed by the external apparatus 500, and that the IoT device 300 can be defended from an attack of an attacker according to a defense guide.

The malicious code defense system according to an example embodiment may transmit the information relating to the malicious code to the user terminal 400, and thereby the user may easily defend the IoT device 300 from the attack through the user terminal 400.

Figure 7:
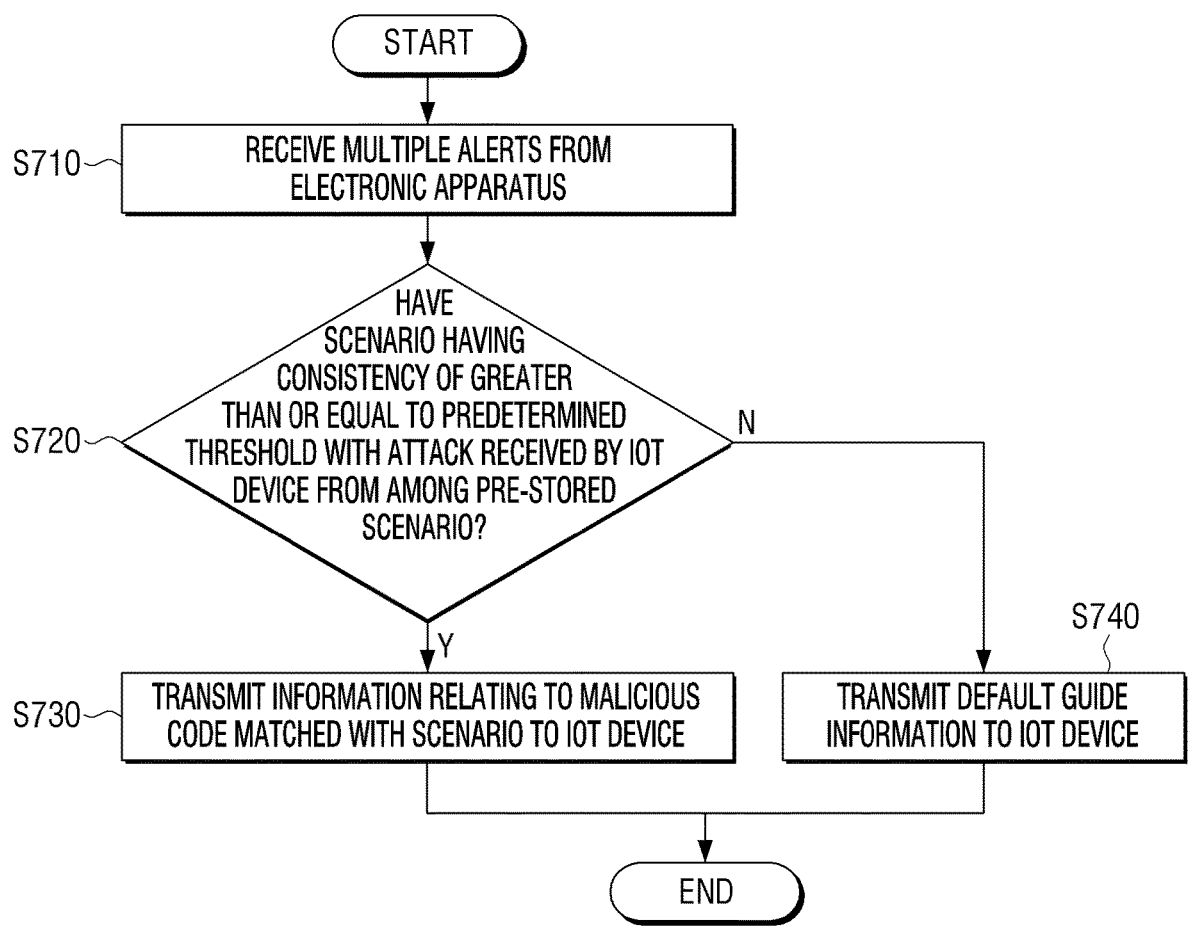
FIG. 7 is a flowchart illustrating an operation of a server in a case that a scenario having a same order of attack as an order of attack received by an Internet-of-things (IoT) is not present in a server according to an embodiment of the disclosure.

FIG. 7 is a flowchart illustrating an operation of a server in a case that a scenario having a same order of attack as an order of attack received by an IoT is not present in a server according to an embodiment of the disclosure.

Referring to FIG. 7, the server 100 may receive an alert for an attack from the electronic apparatus 200, at operation S710. More particularly, in a case that the external apparatus (not illustrated) attacks the IoT device 300 over at least one step, the server 100 may sequentially receive at least one alert.

In addition, the server 100 may identify a scenario having the same order of attack received by the IoT device 300 from among the pre-stored scenarios.

However, according to circumstances, the server 100 may not store a scenario having the same order of attack as the IoT device 300. This is the case when a new malicious code appears, etc.

In this case, at operation S720, the server 100 may identify a scenario having a consistency of greater than or equal to a predetermined threshold as an attack received by the IoT device 300 from among the pre-stored scenarios. Herein, the predetermined threshold may be variously set according to a user command. For example, the predetermined threshold may be set as 80%.

For example, in a case that the external apparatus (not illustrated) sequentially performs first to fifth attacks and a scenario having the same order of attack is not present from among the pre-stored scenarios, the server 100 may identify a scenario which matches with the first to fifth attacks by 80% or more from among the pre-stored scenarios. For example, the identified scenario may be a scenario including first to third attacks, a fourth' attack, and a fifth attack. Alternatively, the identified scenario may be a scenario including first to fourth attacks.

In addition, the server 100 may identify information relating to a malicious code matched with the identified scenario, and transmit the malicious code information to the IoT device 300, at operation S730.

Meanwhile, when it is identified that a scenario having a consistency of greater than or equal to a predetermined threshold as the attack received by the IoT device 300 is not present from among the pre-stored scenarios, the server 100 may transmit the default guide information to the IoT device 300, at operation S740.

Herein, the default guide information may be guide information requesting to block network connection with the external apparatus (not illustrated).

Since the scenario having the consistency of greater than or equal to the predetermined threshold as the attack received by the IoT device 300 is not stored in the storage 120 of the server 100, the default guide information reflects the fact that an appropriate defense means for defending against the attack of the external apparatus (not illustrated) is not stored in the storage 120.

In the example embodiment described above, on the basis of whether a scenario of a consistency of greater than or equal to a predetermined threshold as an attack received by the IoT device 300 is present from among pre-stored scenarios, information relating to a malicious code matched with the scenario is transmitted to the IoT device 300 or default guide information is transmitted to the IoT device 300.

However, this is only an example, and the server 100 may, when a scenario consistent with the attack received by the IoT device 300 is not present from among the pre-stored scenarios, the default guide information to the IoT device 300 regardless of a predetermined threshold.

For example, in a case that the external apparatus (not illustrated) attacks the IoT device 300 according to a scenario consistent with a pre-stored scenario, the guide information may be information for defending against a malicious code matched with the scenario. For example, the guide information may be different according to which scenario the attack of the external apparatus (not illustrated) corresponds.

In contrast, in a case that the external apparatus (not illustrated) attacks the IoT device 300 according to a scenario inconsistent with the pre-stored scenario, which includes a case that the external apparatus (not illustrated) attacks the IoT device 300 according to a scenario consistent with the pre-stored scenario by a predetermined threshold or more), the guide information may be guide information requesting to block network connection with the external apparatus (not illustrated). For example, the guide information may be default information.

For example, in a case that the external apparatus (not illustrated) attacks the IoT device 300 according to a scenario inconsistent with the pre-stored scenario, the server 100 according to an example embodiment may fundamentally block connection between the external apparatus (not illustrated) and the IoT device 300.

Meanwhile, in a case that a scenario having the same order of attack as an order of attack received by the IoT device 300 is not stored, the server 100 according to an example embodiment may update a scenario stored in the storage 120.

For example, the server 100 may match information relating to a malicious code input according to a user command with a scenario corresponding to the order of attack received by the IoT device 300, and store the matched information and the matched scenario in the storage 120.

Accordingly, the server 100 may defend against various attacks from the external apparatus (not illustrated) to the IoT device 300 on the basis of the updated scenario.

Figure 8:
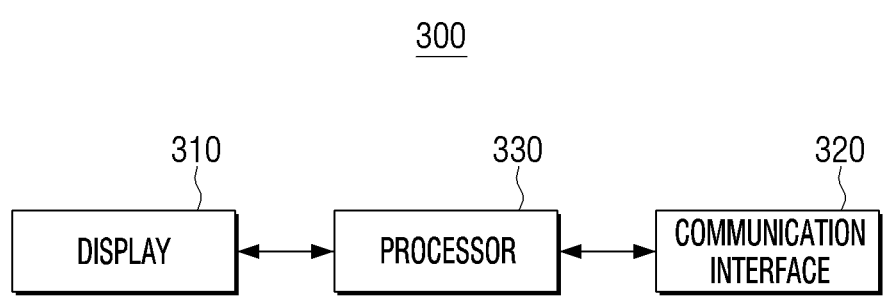
FIG. 8 is a block diagram illustrating an IoT device according to an embodiment of the disclosure.

FIG. 8 is a block diagram illustrating an IoT device according to an embodiment of the disclosure.

Hereinafter, description of an example embodiment overlapping with the description shown above will be omitted or abbreviated.

Referring to FIG. 8, an IoT device 300 according to an example embodiment may include a display 310, a communication interface 320, and a processor 330.

The display 310 may display various screens. For example, in a case that the IoT device 300 is implemented as a computer 300-1, the display 310 may display a content for apparatus control. In a case that the IoT device 300 is implemented as a refrigerator 300-3, the display 310 may display information relating to food stored in the refrigerator, etc.

More particularly, the display 310 may display information about a malicious code received from the server 100. Herein, the information relating to the malicious code may include a name of malicious code to be executed in the IoT device 300 by the external apparatus (not illustrated) or injected into the IoT device 300, and guide information for defending the malicious code.

The display 310 may be realized as various kinds of displays, such as liquid crystal display (LCD), organic light-emitting diode (OLED), liquid crystal on silicon (LCoS), digital light processing (DLP), or the like. In addition, the display 310 may include a driving circuit, a backlight unit, and the like which may be implemented in forms, such as an a-si thin film transistor (TFT), a low temperature poly silicon (LTPS) TFT, an organic TFT (OTFT), and the like.

The communication interface 320 may communicate with the server 100 and perform transmission and reception of various data.

For example, the communication interface 320 may be connected to the server 100 using a wireless communication network. The wireless communication may be, for example, at least one among long-term evolution (LTE), LTE Advance (LTE-A), code division multiple access (CDMA), wideband CDMA (WCDMA), universal mobile telecommunications system (UMTS), wireless broadband (WiBro), and global system for mobile communications (GSM). However, this is only an example, and the communication interface 320 may be connected to the server 100 via various communication links, such as a LAN, a WAN, and the like.

Accordingly, the communication interface 320 may communicate with the server 100 and receive information relating to a malicious code. Herein, the information relating to the malicious code may include a name of malicious code to be executed in the IoT device 300 by the external apparatus (not illustrated) or injected into the IoT device 300, and guide information for defending the malicious code.

In addition, the communication interface 320 may communicate with the electronic apparatus 200 and perform transmission and reception of various data.

For example, the communication interface 320 may be connected to the electronic apparatus 200 using a wireless communication network. However, this is only an example, and the communication interface 320 may be connected to the electronic apparatus 200 using various networks, such as a Bluetooth network, a Wi-Fi network, a ZigBee network, a NFC network, and the like.

Accordingly, the communication interface 320 may communicate with the electronic apparatus 200 and receive information relating to a malicious code. Herein, the information relating to the malicious code may be what the server 100 has transmitted to the electronic apparatus 200 as described above.

The processor 330 may control the overall operations of the IoT device 300.

To this end, the processor 330 may include a CPU, a RAM, and a ROM, and may execute an arithmetic operation or data processing associated with controlling the other elements included in the IoT device 300. For example, the processor 330 may be realized as a SoC.

In a case that the IoT device 300 is attacked by the external apparatus (not illustrated) through the electronic apparatus 200 over at least one step, the processor 330 may receive, from the electronic apparatus 200, information relating to a malicious code corresponding an attack over at least one step.

For example, in a case that the external apparatus (not illustrated) attacks the IoT device 300 through a network of the electronic apparatus 200 over at least one step, the processor 330 may receive information relating to a malicious code corresponding to an attack performed over at least one step rather than receiving fragmentary malicious code information for the respective attacks from the electronic apparatus 200.

Herein, the information relating to the malicious code may be information generated on the basis of at least one attack and an order of attacks performed over at least one step.

For example, in a case that the external apparatus (not illustrated) performs the first to third attacks to the IoT device 300 and the first to third attacks are performed sequentially, the information relating to the malicious code may be generated on the basis of the first to third attacks and an order of the first to third attacks.

In addition, the processor 330 may display the received malicious code information on the display 310.

Meanwhile, the malicious code information may include at least one of a name of a malicious code corresponding to an attack performed over at least one step, information relating to attacks sequentially executed by the external apparatus (not illustrated) and an order of the attacks, and guide information for defending against the malicious code.

In addition, when a user command to defend a malicious code is input according to the guide information, the processor 330 may perform a defense operation corresponding to the guide information. Herein, the guide information may be blocking an IP of the external apparatus (not illustrated), etc.

Figure 9:
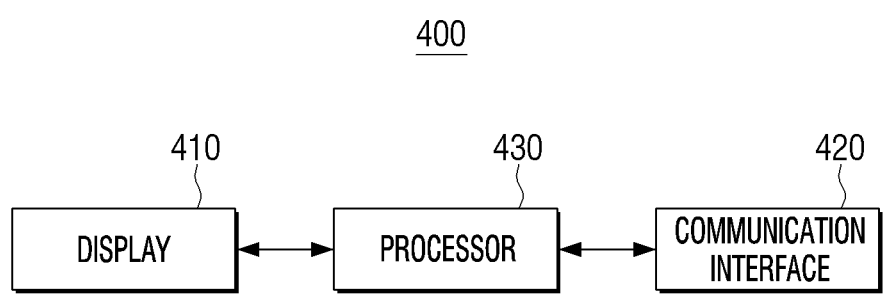
FIG. 9 is a block diagram illustrating a user terminal according to an embodiment of the disclosure.

FIG. 9 is a block diagram illustrating a user terminal according to an embodiment of the disclosure.

Referring to FIG. 9, a user terminal 400 according to an example embodiment may include a display 410, a communication interface 420, and a processor 430.

The display 410 may display various screens. For example, in a case that the IoT device 300 is implemented as a webcam 300-2, the display 410 may display a content for webcam control. In a case that the IoT device 300 is implemented as a refrigerator 300-3, the display 410 may display information relating to food stored in the refrigerator, etc.

More particularly, the display 410 may display information about a malicious code received from the server 100. Herein, the information relating to the malicious code may include a name of malicious code to be executed in the IoT device 300 by the external apparatus (not illustrated) or injected into the IoT device 300, and guide information for defending the malicious code.

The display 410 may be realized as various kinds of displays, such as LCD, OLED, LCoS, DLP, or the like.

The communication interface 420 may communicate with the server 100 and perform transmission and reception of various data.

For example, the communication interface 420 may be connected to the server 100 using a wireless communication network. The wireless communication may be, for example, at least one among LTE, LTE-A, CDMA, WCDMA, UMTS, WiBro, and GSM.

Accordingly, the communication interface 420 may communicate with the server 100 and receive information relating to a malicious code. Herein, the information relating to the malicious code may include a name of malicious code to be executed in the IoT device 300 by the external apparatus (not illustrated) or injected into the IoT device 300, and guide information for defending the malicious code.

In addition, the communication interface 420 may communicate with the electronic apparatus 200 and perform transmission and reception of various data.

For example, the communication interface 420 may be connected to the electronic apparatus 200 using a wireless communication network. However, this is only an example, and the communication interface 320 may be connected to the electronic apparatus 200 using various networks, such as a Bluetooth network, a Wi-Fi network, a ZigBee network, a NFC network, and the like.

Accordingly, the communication interface 420 may communicate with the electronic apparatus 200 and receive information relating to a malicious code. Herein, the information relating to the malicious code may be what the server 100 has transmitted to the electronic apparatus 200.

The processor 430 may control a general operation of the user terminal 400.

To this end, the processor 430 may include a CPU, a RAM, and a ROM, and may execute an arithmetic operation or data processing associated with controlling the other elements included in the IoT device 300.

In a case that the IoT device 300 is attacked by the external apparatus (not illustrated) through the electronic apparatus 200 over at least one step, the processor 430 may receive, from the server 100, information relating to a malicious code corresponding an attack over at least one step.

For example, in a case that the external apparatus (not illustrated) attacks the IoT device 300 through a network of the electronic apparatus 200 over at least one step, the processor 430 may receive information relating to a malicious code corresponding to an attack performed over at least one step rather than receiving fragmentary malicious code information for the respective attacks from the server 100.

Herein, the information relating to the malicious code may be information generated on the basis of at least one attack and an order of attacks performed over at least one step.

For example, in a case that the external apparatus (not illustrated) performs the first to third attacks to the IoT device 300 and the first to third attacks are performed sequentially, the information relating to the malicious code may be generated on the basis of the first to third attacks and an order of the first to third attacks.

In addition, the processor 430 may display the received malicious code information on the display 410.

Meanwhile, the malicious code information may include at least one of a name of a malicious code corresponding to an attack performed over at least one step, information relating to attacks sequentially executed by the external apparatus (not illustrated) and an order of the attacks, and guide information for defending against the malicious code.

In addition, when a user command to defend against a malicious code is input according to the guide information, the processor 430 may perform a defense operation corresponding to the guide information. Herein, the guide information may be blocking an IP of the external apparatus (not illustrated), etc.

Figure 10:
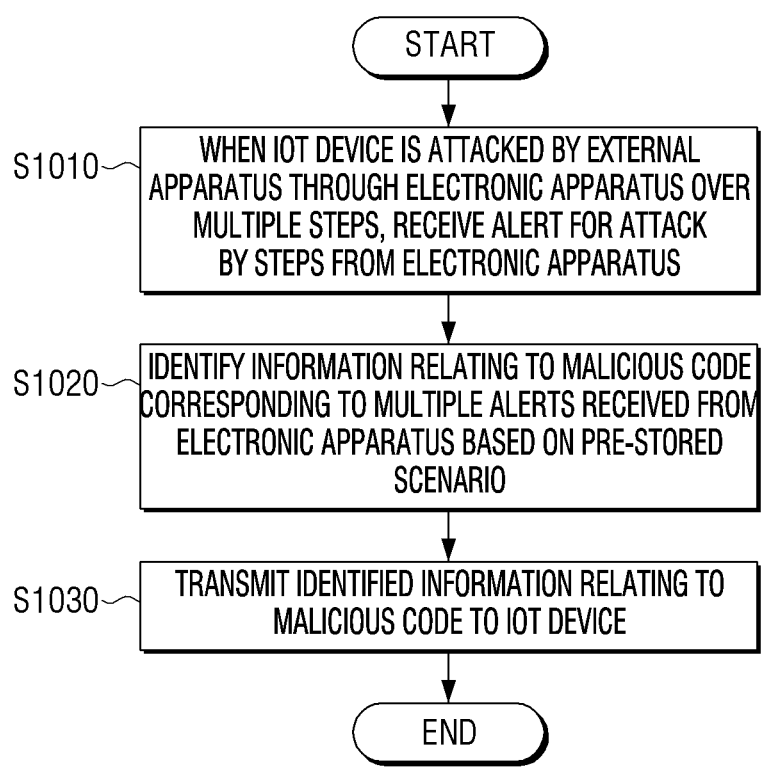
FIG. 10 is a flowchart illustrating an operation of a server according to an embodiment of the disclosure.

FIG. 10 is a flowchart illustrating an operation of a server according to an embodiment of the disclosure.

Referring to FIG. 10, in a case that an IoT device is attacked by an external apparatus through an electronic apparatus over at least one step, a server according to an example embodiment may receive an alert for the attack received by stages from the electronic apparatus, at operation S1010.

In addition, the server may identify information relating to a malicious code corresponding to at least one alert received from the electronic apparatus on the basis of a pre-stored scenario, at operation S1020. For example, when at least one alert is received from the electronic apparatus, the server may identify an order of attacks received by the IoT device on the basis of information relating to a time at which the attack included in the received at least one alert is performed. In addition, the server may identify a scenario having the same order of attack as an order of attack received by the IoT device from among the pre-stored scenario, and identify information relating to the malicious code matched with the determined scenario.

Thereafter, the server may transmit the identified malicious code information to the IoT device, at operation S1030. In a case that the IoT device includes a display, the server may transmit the malicious code information to the IoT device. In a case that the IoT device does not include the display, the server may transmit the malicious code information to the user terminal.

Accordingly, the user can easily defend the IoT device from attacks of the external apparatus.

A method for defending against a malicious code according to the above-described various example embodiments may be embodied as a program and then stored on various types of recording media. For example, a computer program that has been processed by various processors and therefore has become capable of executing the aforementioned defense methods may be stored in a non-transitory recording medium and be used.

For example, a non-transitory computer readable medium which stores a program for performing the operations of, when an IoT device is attacked from an external apparatus through an electronic apparatus over at least one step, receiving an alert for the attack received by steps, identifying information relating to a malicious code corresponding to the at least one alert received from the electronic apparatus on the basis of a pre-stored scenario, and transmitting the identified malicious code information to the IoT device may be provided.

The non-transitory computer readable medium refers to a medium that stores data semi-permanently rather than storing data for a very short time, such as a register, a cache, a memory or etc., and is readable by an apparatus. Specifically, the above-described various applications or programs may be stored in the non-transitory computer readable medium, for example, a compact disc (CD), a digital versatile disc (DVD), a hard disc, a Blu-ray disc, a universal serial bus (USB), a memory card, a ROM, and the like, and may be provided.

While the disclosure has been shown and described with reference to various embodiments thereof, it will be understood by those skilled in the art that various changes in form and details may be made therein without departing from the spirit and the scope of the disclosure as defined by the appended claims and their equivalents.

What is claimed is:

1. A server comprising:
   a communication interface configured to communicate with an electronic apparatus connected to an Internet of things (IoT) device;
   a storage configured to store a scenario about an attack sequentially executed by an external apparatus over a plurality of steps and information relating to a malicious code corresponding to the scenario; and
   a processor configured to:
      in response to the IoT device being attacked sequentially by the external apparatus over the plurality of steps through the electronic apparatus, receive sequentially, from the electronic apparatus, a plurality of alerts corresponding to the plurality of steps,
      identify an order of attacks based on time information included in the plurality of alerts,
      identify a scenario corresponding to the order of attacks from among a plurality of pre-stored scenarios, and
      identify information relating to a malicious code corresponding to the identified scenario.

2. The server of claim 1, wherein the processor is further configured to transmit the identified information relating to the malicious code to at least one of a user terminal or the IoT device.

3. The server of claim 1, wherein the scenario includes information relating to an attack sequentially executed by the external apparatus to allow the external apparatus to inject the malicious code into the IoT device.

4. The server of claim 2, wherein the processor is further configured to:
   identify the scenario having a same order of attacks as the order of attacks received by the IoT device from among the plurality of pre-stored scenarios, and
   transmit information relating to the malicious code corresponding to the identified scenario to at least one of the user terminal or the IoT device.

5. The server of claim 4, wherein the processor is further configured to:
   based on the scenario having the same order of attacks as the order of attacks received by the IoT device not being present from among the plurality of pre-stored scenarios, identify a scenario having a consistency of greater than or equal to a predetermined threshold with the attacks received by the IoT device from among the plurality of pre-stored scenarios, and
   transmit information relating to the malicious code corresponding to the identified scenario to at least one of the user terminal or the IoT device.

6. The server of claim 4, wherein the processor is further configured to:
   based on the scenario having the same order of attacks as the order of attacks received by the IoT device not being present from among the plurality of pre-stored scenarios, match information relating to a malicious code input according to a user command with a scenario corresponding to the order of attacks received by the IoT device and store the information and the scenario matched with each other.

7. The server of claim 4, wherein the processor is further configured to:
   based on the scenario having the same order of attacks as the order of attacks received by the IoT device not being present from among the plurality of pre-stored scenarios, transmit guide information requesting to block a network connection with the external apparatus to at least one of the user terminal or the IoT device.

8. The server of claim 2, wherein the processor is further configured to:
   based on a security weakness being detected in the electronic apparatus, receive an alert indicating the security weakness from the electronic apparatus, and
   based on at least one attack from among attacks received by the IoT device over at least one step corresponding to an attack using the security weakness, transmit the information relating to the malicious code to at least one of the user terminal or the IoT device.

9. The server of claim 1, wherein the processor is further configured to:
   identify whether the IoT device includes a display for displaying the information relating to the malicious code,
   based on the IoT device including the display, transmit the information relating to the malicious code to the IoT device, and
   based on the IoT device not including the display, transmit the information relating to the malicious code to a user terminal.

10. The server of claim 1,
    wherein the processor is further configured to, in response to determining that first to third steps of the plurality of steps have been performed in an order corresponding to first to third alerts, respectively, identify the scenario, and
    wherein the scenario corresponds to the first to third steps being performed in the order corresponding to the first to third alerts, respectively.

11. A method for preventing a malicious code, the method comprising:
    in response to an Internet of things (IoT) device being attacked sequentially by an external apparatus through an electronic apparatus over a plurality of steps, receiving sequentially, from the electronic apparatus, a plurality of alerts corresponding to the plurality of steps;
    identifying an order of attacks based on time information included in the plurality of alerts;
    identifying a scenario corresponding to the order of attacks from among a plurality of pre-stored scenarios; and
    identifying information relating to a malicious code based on the identified scenario,
    wherein the scenario includes information relating to an attack over the plurality of steps sequentially executed by the external apparatus.

12. The method of claim 11, further comprising:
    transmitting the identified information relating to the malicious code to at least one of a user terminal or the IoT device.

13. The method of claim 11, wherein the scenario includes information relating to an attack comprising the plurality of steps sequentially executed by the external apparatus to allow the external apparatus to inject the malicious code into the IoT device.

14. The method of claim 12, wherein the transmitting comprises:
    identifying the scenario having a same order of attacks as the order of attacks received by the IoT device from among the plurality of pre-stored scenarios; and
    transmitting information relating to the malicious code corresponding to the identified scenario to at least one of the user terminal or the IoT device.

15. The method of claim 14, wherein the transmitting comprises:
    based on the scenario having the same order of attacks as the order of attacks received by the IoT device not being present from among the plurality of pre-stored scenarios, identifying a scenario having a consistency of greater than or equal to a predetermined threshold with attacks received by the IoT device from among the plurality of pre-stored scenarios; and
    transmitting information relating to the malicious code corresponding to the identified scenario to at least one of the user terminal or the IoT device.

16. The method of claim 14, further comprising:
    based on the scenario having the same order of attacks as the order of attacks received by the IoT device not being present from among the plurality of pre-stored scenarios, matching information relating to a malicious code input according to a user command with a scenario corresponding to the order of attacks received by the IoT device and storing the information and the scenario matched with each other.

17. The method of claim 14, further comprising:
    based on the scenario having the same order of attacks as the order of attacks received by the IoT device not being present from among the plurality of pre-stored scenarios, transmitting guide information requesting to block a network connection with the external apparatus to at least one of the user terminal or the IoT device.

18. The method of claim 12, further comprising:
    based on a security weakness being detected in the electronic apparatus, receiving an alert indicating the security weakness from the electronic apparatus, and
    based on at least one attack from among attacks received by the IoT device over at least one step corresponding to an attack using the security weakness, transmitting the information relating to the malicious code to at least one of the user terminal or the IoT device.

19. The method of claim 11, further comprising:
    identifying whether the IoT device includes a display for displaying the information relating to the malicious code;
    based on the IoT device including the display, transmitting the information relating to the malicious code to the IoT device; and
    based on the IoT device not including the display, transmitting the information relating to the malicious code to a user terminal.

* * * * *